(12) United States Patent
Kim et al.

(10) Patent No.: US 11,492,523 B2
(45) Date of Patent: Nov. 8, 2022

(54) ACRYL-BASED ADHESIVE COMPOSITION, POLARIZING PLATE, AND DISPLAY DEVICE

(71) Applicant: LG Chem, Ltd., Seoul (KR)

(72) Inventors: Eun Suk Kim, Daejeon (KR); Kee Young Kim, Daejeon (KR)

(73) Assignee: LG Chem, Ltd.

( * ) Notice: Subject to any disclaimer, the term of this patent is extended or adjusted under 35 U.S.C. 154(b) by 72 days.

(21) Appl. No.: 16/954,800

(22) PCT Filed: Feb. 14, 2019

(86) PCT No.: PCT/KR2019/001842
§ 371 (c)(1),
(2) Date: Jun. 17, 2020

(87) PCT Pub. No.: WO2020/067613
PCT Pub. Date: Apr. 2, 2020

(65) Prior Publication Data
US 2021/0095169 A1 Apr. 1, 2021

(30) Foreign Application Priority Data
Sep. 28, 2018 (KR) .................. 10-2018-0116476

(51) Int. Cl.
| | | |
|---|---|---|
| *C09J 133/08* | (2006.01) | |
| *C09J 7/22* | (2018.01) | |
| *C09J 11/04* | (2006.01) | |
| *C09J 11/06* | (2006.01) | |
| *G02F 1/1333* | (2006.01) | |
| *G02F 1/1335* | (2006.01) | |
| *G06F 3/044* | (2006.01) | |

(52) U.S. Cl.
CPC ............... *C09J 133/08* (2013.01); *C09J 7/22* (2018.01); *C09J 11/04* (2013.01); *C09J 11/06* (2013.01); *G02F 1/13338* (2013.01); *G02F 1/133528* (2013.01); *G06F 3/044* (2013.01); *C09J 2301/312* (2020.08); *C09J 2433/00* (2013.01); *C09K 2323/057* (2020.08); *G02F 2202/28* (2013.01)

(58) Field of Classification Search
CPC ............... C09J 133/08; C09J 2301/312; C09J 2433/00; G02F 1/133528; G02F 2202/28; C09K 2323/057; C08F 220/1804; G02B 5/30; G06F 3/041
See application file for complete search history.

(56) References Cited

U.S. PATENT DOCUMENTS

| | | | |
|---|---|---|---|
| 2006/0057368 A1 | 3/2006 | Kobayashi et al. | |
| 2007/0269660 A1* | 11/2007 | Killilea ............... | C04B 41/71 428/414 |
| 2009/0156731 A1* | 6/2009 | Lee .................. | C09J 133/26 524/521 |
| 2010/0209631 A1* | 8/2010 | Kim ................. | C09J 133/14 428/1.54 |
| 2011/0007244 A1 | 1/2011 | Kim et al. | |
| 2014/0160405 A1 | 6/2014 | Huh et al. | |
| 2014/0204317 A1 | 7/2014 | Huh et al. | |
| 2014/0272201 A1* | 9/2014 | Takeda ............... | C09J 133/066 428/1.54 |
| 2016/0152876 A1 | 6/2016 | Kim et al. | |
| 2016/0369136 A1 | 12/2016 | Suzuki et al. | |
| 2017/0152414 A1* | 6/2017 | Lee .................. | G02B 5/3033 |
| 2017/0283666 A1 | 10/2017 | Kim et al. | |

FOREIGN PATENT DOCUMENTS

| | | |
|---|---|---|
| CN | 1749344 A | 3/2006 |
| CN | 103748488 A | 4/2014 |
| CN | 106256840 A | 12/2016 |
| CN | 106471085 A | 3/2017 |
| EP | 3106498 A1 | 12/2016 |
| JP | H11158342 A | 6/1999 |
| JP | 2013189631 A | 9/2013 |
| JP | 2014152312 A | 8/2014 |
| JP | 6078132 B1 | 2/2017 |
| JP | 2017025128 A | 2/2017 |
| JP | 2017025128 A * | 2/2017 |
| JP | 2018145368 A | 9/2018 |

(Continued)

OTHER PUBLICATIONS 2-(methacryloyloxy)ethyl acetoacetate, 537403, Sigma Aldrich, Merck KGaA, 2021. (Year: 2021).*
Acetoacetylethyl methacrylate, ChemSpider, Royal Society of Chemistry, 2022. (Year: 2022).*
Extended European Search Report including Written Opinion for Application No. EP19866646.3, dated Oct. 1, 2020, pp. 1-9.
International Search Report from Application No. PCT/KR2019/001842 dated Jun. 25, 2019, 2 pages.

(Continued)

*Primary Examiner* — Sophie Hon
(74) *Attorney, Agent, or Firm* — Lerner, David, Littenberg, Krumholz & Mentlik, LLP

(57) ABSTRACT

The present invention relates to an acryl-based adhesive composition containing an acryl-based copolymer, which is formed by polymerization of a monomer mixture that contains a (meth)acryl-based monomer having an acetoacetyl group, a (meth)acryl-based monomer having a hydroxy group, a (meth)acrylate monomer having an alicyclic group, and an alkyl (meth) acrylate-based monomer; and a curing agent containing a metal chelate compound and an isocyanate compound, in which the acryl-based adhesive composition has a glass transition temperature of −30° C. or greater after curing; and a polarizing plate and a display device prepared using the same.

13 Claims, No Drawings

(56) References Cited

FOREIGN PATENT DOCUMENTS

| | | | | | |
|---|---|---|---|---|---|
| KR | 2009077685 | A | * | 7/2009 | |
| KR | 20090077648 | A | | 7/2009 | |
| KR | 20090077685 | A | | 7/2009 | |
| KR | 101183790 | B1 | | 9/2012 | |
| KR | 20130141524 | A | | 12/2013 | |
| KR | 20160002586 | A | | 1/2016 | |
| KR | 20160060410 | A | * | 5/2016 | ............ G03F 7/033 |
| KR | 20160073329 | A | | 6/2016 | |
| KR | 20160148457 | A | | 12/2016 | |
| KR | 20170034044 | A | | 3/2017 | |
| KR | 20180036968 | A | | 4/2018 | |
| TW | 201821574 | A | | 6/2018 | |
| WO | 2014092186 | A1 | | 6/2014 | |
| WO | 2018142815 | A1 | | 8/2018 | |

OTHER PUBLICATIONS

Chinese Search Report for Application No. 201980006734.1, dated Apr. 30, 2021, 2 pages.

Taiwanese Search Report for Application No. 108106301, dated May 10, 2021, 1 page.

* cited by examiner

ACRYL-BASED ADHESIVE COMPOSITION, POLARIZING PLATE, AND DISPLAY DEVICE

CROSS-REFERENCE TO RELATED APPLICATIONS

The present application is a national phase entry under 35 U.S.C. § 371 of International Application No. PCT/KR2019/001842 filed on Feb. 14, 2019, which claims priority to Korean Patent Application No. 10-2018-0116476 filed on Sep. 28, 2018 the disclosures of which are incorporated herein by reference.

TECHNICAL FIELD

The present invention relates to an acryl-based adhesive composition, a polarizing plate, and a display device, and more particularly, to an acryl-based adhesive composition which has excellent durability and does not corrode transparent electrodes of a touch panel, and a polarizing plate and a display device prepared using the same.

BACKGROUND ART

In general, a liquid crystal display device (LCD) is provided with a liquid crystal cell containing a liquid crystal and a polarizing plate, and an adhesive layer is used to attach the liquid crystal cell and the polarizing plate. As the adhesive for the attachment of a polarizing plate forming such an adhesive layer, an acryl-based resin, rubbers, a urethane-based resin, a silicone-based resin, ethylene vinyl acetate (EVA), etc. are used. Among them, adhesives having, as a base, an acryl-based resin with transparency, oxidation resistance, and yellowing resistance are widely used.

Meanwhile, as small display devices (e.g., car displays, mobile phones, navigation devices, etc.) are provided with a touch function recently, these devices require high-durability high-reliability. Therefore, in the related art, a method of improving durability has been used by forming a strong cross-linking structure in the adhesive composition by having a carboxy group in an adhesive composition for a polarizing plate. However, the adhesives using a monomer having a carboxy group has problems in that when these adhesives are brought into contact with a touch panel for a long time, the carboxylic acid component reacts with the transparent electrode of the touch panel thereby causing corrosion of the transparent electrode and deteriorating the physical properties of the touch panel.

Therefore, there is a need for the development of an adhesive composition capable of achieving high durability without deteriorating the physical properties of a touch panel.

DISCLOSURE OF THE INVENTION

Technical Problem

The present invention, which has been made to solve the above problems, provides an acryl-based adhesive composition which has high durability without causing corrosion of a touch panel.

Additionally, the present invention provides a polarizing plate including an adhesive layer, which is prepared by an acryl-based adhesive composition described above, and a display device including the polarizing plate.

Technical Solution

An aspect of the present invention provides an acryl-based adhesive composition, which contains an acryl-based copolymer, that is formed by polymerizing a monomer mixture that contains a (meth)acryl-based monomer having an acetoacetyl group, a (meth)acryl-based monomer having a hydroxy group, a (meth)acrylate monomer having an alicyclic group, and an alkyl (meth) acrylate-based monomer; and a curing agent containing a metal chelate compound and an isocyanate compound, in which the acryl-based adhesive composition has a glass transition temperature of −30° C. or greater after curing.

Another aspect of the present invention provides a polarizing plate, which includes a polarizing film; and an adhesive layer that is formed on one surface or both surfaces of the polarizing film and includes a cured product of the acryl-based adhesive composition according to the present invention.

Still another aspect of the present invention provides a display device which includes the polarizing plate of the present invention.

Advantageous Effects

The acryl-based adhesive composition according to the present invention can implement excellent durability of an acryl-based copolymer even when a monomer having a carboxy group is not used or is contained in a trace amount, by using a monomer having a hydroxy group and a monomer having an acetoacetyl group and using a metal chelate compound and an isocyanate compound as a curing agent, at the time of forming an acryl-based copolymer, thereby forming a strong crosslinking structure, and as a result, it is possible to inhibit the occurrence of side effects (e.g., touch panel corrosion, etc.) caused by a monomer having a carboxy group.

Additionally, with regard to the acryl-based adhesive composition of the present invention, an adhesive composition with a relatively high glass transition temperature may be formed using a monomer having an alicyclic group, and excellent adhesive strength may be implemented even when the monomer having a carboxy group is not used or is contained in a trace amount.

BEST MODE FOR CARRYING OUT THE INVENTION

Hereinafter, the present invention will now be described in detail.

When the terms such as "comprises", "having", "comprised", etc. are used in this specification, other parts may be added as long as "~only" is not used. When a constituting element is expressed in terms of a single element, it will also include cases where plural elements are included, unless the constituting element is explicitly specified otherwise.

Additionally, in interpreting the constituting elements of the present invention, it is interpreted to include an error range even if there is no additional explicit description In the present specification, "(meth)acryl" is a collective term for acryl and methacryl. For example, (meth) acrylate may include methacrylates and acrylates, and (meth) acrylic acid may include acrylic acid and methacrylic acid.

In the present specification, the "X to Y" that represents a range refers to "greater than x and equal to or less than Y", Hereinafter, the adhesive composition according to the present invention will be specifically explained.

Adhesive Composition

The adhesive composition according to the present invention includes an acryl-based adhesive composition containing an acryl-based copolymer, which is formed by polymerization of a monomer mixture that contains a (meth)acryl-based monomer having an acetoacetyl group, a (meth)acryl-based monomer having a hydroxy group, a (meth)acrylate monomer having an alicyclic group, and an alkyl (meth)acrylate-based monomer; and a curing agent containing a metal chelate compound and an isocyanate compound, in which the acryl-based adhesive composition has a glass transition temperature of −30° C. or greater after curing.

Hereinafter, the components of the adhesive composition according to the present invention will be described.

(1) Acryl-Based Copolymer

The acryl-based copolymer may be formed by polymerizing a monomer mixture, which contains (A) a (meth)acryl-based monomer having an acetoacetyl group, (B) a (meth)acryl-based monomer having a hydroxy group (C) a (meth)acrylate monomer having an alicyclic group, and (D) alkyl (meth)acrylate-based monomer.

The (A) (meth)acryl-based monomer having an acetoacetyl group is for forming a strong crosslinking structure in an adhesive composition so as to improve the durability of the adhesive composition by forming a crosslinking point in the copolymer along with (B) a (meth)acryl-based monomer having a hydroxy group, which will be described later.

As the (A) (meth)acryl-based monomer having an acetoacetyl group may be, for example, at least one kind selected from the group consisting of acetoacetyl ethyl methacrylate and acetoacetyl ethyl acrylate may be used, but is not limited thereto.

Meanwhile, the (A) (meth)acryl-based monomer having an acetoacetyl group may be contained in an amount of 1-40 parts by weight, preferably 1-20 parts by weight, and more preferably 3-10 parts by weight, relative to 100 parts by weight of the monomer mixture. When the amount of the (A) (meth)acryl-based monomer having an acetoacetyl group meets the above range, excellent durability and transparency may be secured. Specifically, when the amount of the (A) (meth)acryl-based monomer having an acetoacetyl group is less than 1 part by weight, it is difficult to obtain high durability, whereas when the amount of the (A) (meth)acryl-based monomer having an acetoacetyl group exceeds 40 parts by weight, the haze becomes high and may not be suitable as an adhesive for an optical member.

Then, the (B) (meth)acryl-based monomer having a hydroxy group is for improving the adhesive strength of an adhesive composition and forming a crosslinking structure with a curing agent.

As the (B) (meth)acryl-based monomer having a hydroxy group, for example, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol(meth)acrylate, 2-hydroxypropylene glycol(meth)acrylate, or a mixture thereof may be used, but is not limited thereto.

The (B) (meth)acryl-based monomer having a hydroxy group may be contained in an amount of 1-10 parts by weight, and preferably 1-8 parts by weight, relative to 100 parts by weight of the monomer mixture. When the amount of a (meth)acryl-based monomer having a hydroxy group meets the above range, excellent adhesive strength and durability can be implemented.

Then, the (C) (meth) acrylate-based monomer having an alicyclic group is for improving the adhesive strength of an adhesive composition by increasing the glass transition temperature ($T_g$) of the acryl-based copolymer.

As the (C) (meth) acrylate-based monomer having an alicyclic group, for example, dicyclopentyl (meth)acrylate, cyclohexyl (meth)acrylate, isobornyl (meth)acrylate, tetrahydroperfuryl (meth)acrylate, 1-acryloxy-2-hydroxyadamantane, 3,4-epoxycyclohexylmethyl (meth)acrylate, 5-ethyl-1,3-dioxanylmethyl (meth)acrylate, dihydroxycyclopentadienyl (meth) acrylate, or a mixture thereof may be used, but is not limited thereto.

The (C) (meth) acrylate-based monomer having an alicyclic group may be contained in an amount of 1-10 parts by weight, preferably 1-8 parts by weight, and more preferably 2-7 parts by weight, relative to 100 parts by weight of a monomer mixture. When the amount of the (C) (meth) acrylate-based monomer having an alicyclic group meets the above range, an adhesive composition having an appropriate viscosity and a weight average molecular weight may be prepared.

Then, the (D) alkyl (meth) acrylate-based monomer is for providing an adhesive strength, and the (D) alkyl (meth)acrylate-based monomer may have a $C_{1-14}$ alkyl group. This is because when the alkyl group is too long, the cohesive strength of the adhesive is deteriorated and it becomes difficult to control the glass transition temperature ($T_g$) or adhesive performance. Examples of the alkyl (meth) acrylate monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meta)acrylate, and in present invention, one kind or a mixture of two or more kinds may be used.

As the (D) alkyl (meth) acrylate-based monomer, a mixture of an alkyl acrylate monomer and an alkyl methacrylate monomer may be used, and specifically, a mixture of a methyl methacrylate and a butyl acrylate may be used. When the alkyl acrylate and the alkyl methacrylate are mixed for use as such, a relatively higher glass transition temperature may be implemented compared to a case where only an alkyl acrylate monomer is used after curing of the adhesive composition.

The alkyl (meth) acrylate-based monomer may be contained in an amount of 40-97 parts by weight, 40-96 parts by weight, preferably 64-97 parts by weight, and more preferably 78-94 parts by weight, relative to 100 parts by weight of a monomer mixture. When the amount of the alkyl (meth) acrylate-based monomer meets the above range, excellent adhesive strength and durability can be obtained.

Meanwhile, when a mixture of an alkyl acrylate and an alkyl methacrylate is used as the alkyl (meth) acrylate-based monomer, the mixing ratio between the alkyl acrylate and the alkyl methacrylate may be in a ratio of 20:1 to 5:1, and preferably 20:1 to 10:1. When the mixing ratio between the alkyl acrylate and the alkyl methacrylate meets the above range, appropriate adhesive strength and a high glass transition temperature can be implemented.

According to an exemplary embodiment, the acryl-based copolymer may be formed by polymerizing a mixture, which contains 1-40 parts by weight of a (meth)acryl-based monomer having an acetoacetyl group, 1-10 parts by weight of a (meth)acryl-based monomer having a hydroxy group, 1-10 parts by weight of (meth)acryl-based monomer having an alicyclic group, and 40-97 parts by weight of an alkyl (meth) acrylate-based monomer, relative to 100 parts by weight of the monomer mixture.

Meanwhile, the monomer mixture for preparing the acryl-based copolymer according to the present invention may further include a (E) (meth) acrylate-based monomer having an aromatic group, as necessary.

When the (E) (meth) acrylate-based monomer having an aromatic group is included, there is an effect of improving the light leakage of a display device.

The (E) (meth) acrylate-based monomer having an aromatic group may include, for example, phenoxy ethyl (meth) acrylate, phenyl (meth)acrylate, benzyl (meth)acrylate, phenoxy diethylene glycol (meth)acrylate, 2-(1-naphthyloxy)-1-ethyl (meth)acrylate, hydroxyethylated β-naphthol acrylate, biphenyl (meth)acrylate, or a mixture thereof, etc., but is not limited thereto.

The (E) (meth) acrylate-based monomer having an aromatic group may be contained in an amount of 1-20 parts by weight, preferably 1-15 parts by weight, and more preferably 5-15 parts by weight, relative to 100 parts by weight of a monomer mixture. When the amount of the (E) (meth) acrylate-based monomer having an aromatic group meets the above range, an adhesive composition with an appropriate viscosity and weight average molecular weight can be prepared and an effect of improving excellent light leakage can be obtained According to an exemplary embodiment, the acryl-based copolymer may be prepared by polymerizing a mixture, which contains 1-40 parts by weight of, a (meth)acryl-based monomer having an acetoacetyl group, 1-10 parts by weight of (meth)acryl-based monomer having a hydroxy group, 1-10 parts by weight of (meth) acrylate-based monomer having an alicyclic group, 1-20 parts by weight of a (meth) acrylate-based monomer having an aromatic group, and 40-96 parts by weight of an alkyl (meth)acrylate-based monomer, relative to 100 parts by weight of the monomer mixture.

Additionally, the monomer mixture for the preparation of the acryl-based copolymer according to the present invention may further include a small amount of a (F) monomer having a carboxy group, as necessary.

A monomer having a carboxy group has an effect of improving the durability of an adhesive composition. However, when the monomer is used in an amount greater than a certain amount, the acid component may react with the electrode of a touch panel and cause corrosion of the touch panel thereby deteriorating the performances of the touch panel. Accordingly, in the present invention, only a small amount of the monomer having a carboxy group by which corrosion will not occur can be used. Specifically, in the present invention, the (F) monomer having a carboxy group may be contained in an amount of less than 3 parts by weight, preferably greater than 0 and less than 3 parts by weight, and more preferably greater than 0 and less than 2 parts by weight, relative to 100 parts by weight of the monomer mixture. In the conventional adhesive compositions, when the monomer having a carboxy group is contained in a small amount as described above, there was a problem in that an effect of sufficiently improving durability cannot be obtained. However, in the present invention, durability can be improved by forming a crosslinking structure using a monomer having an acetoacetyl group and a curing agent consisting of two different kinds, and thus durability can be sufficiently improved even when the monomer having a carboxy group is used in a small amount as described above.

The (F) monomer having a carboxy group may include, for example, (meth)acrylic acid, 2-(meth)acryloyloxy acetic acid, 3-(meth)acryloyloxy propyl acid, 4-(meth)acryloyloxy butyl acid, acrylic acid dimer, itaconic acid, maleic acid, maleic anhydride, etc., but is not limited thereto.

The acryl-based copolymer according to the present invention may be prepared by preparing a monomer mixture by mixing each of the monomers described above followed by polymerization of the same. In particular, the polymerization method is not particularly limited, but various polymerization methods known in the art (e.g., solution polymerization, photopolymerization, bulk polymerization, suspension polymerization, emulsion polymerization, etc.) may be used. In the polymerization, a polymerization initiator, an agent for controlling molecular weight, etc. may be further added, and the timing of introduction of each component is not particularly limited. That is, each of the components may be injected in a single batch or in several divided batches.

In the present invention, the acryl-based copolymer may be prepared using a solution polymerization method, and the solution polymerization method may be performed at a polymerization temperature of 50° C. to 140° C. in a state where each of the monomers is uniformed mixed by adding an initiator, an agent for controlling molecular weight, etc. Examples of the initiator that may be used in the above process may include an azo-based initiator (e.g., azobisisobutyronitrile, azobiscyclohexanecarbonitrile, etc.); and/or a conventional initiator (e.g., peroxides (benzoyl peroxide, acetyl peroxide, etc.)), and one or two or more kinds thereof may be mixed for use, but the initiator is not limited thereto. Additionally, as the agent for controlling molecular weight, mercaptans (e.g., t-dodecyl mercaptan, n-dodecyl mercaptan, dipentyne, etc.), terpenes (e.g., dipentene, t-terpene, etc.), halogenated hydrocarbons (e.g., chloroform, carbon tetrachloride, etc.), pentaerythritol tetrakis 3-mercaptopropionate, etc. may be used, but the agent for controlling molecular weight is not limited thereto.

Meanwhile, the acryl-based copolymer of the present invention prepared as described above may have a polymerization conversion of 70% to 90%, and specifically 75% to 85%. When the polymerization conversion is too low, the weight average molecular weight of an acryl-based copolymer becomes too small thus deteriorating durability, whereas when the polymerization conversion is too high, the proportion of low molecular weight entity becomes high thus deteriorating the adhesive performance. Meanwhile, the polymerization conversion is a value obtained by measuring the amount of the solid fraction, after volatizing a polymerization solvent and unreacted monomers by drying the reaction intermediate obtained during the polymerization reaction at 150° C. for 30 minutes, dividing the measured amount of the solid fraction by the amount of the solid fraction of the initial monomers, and multiplying 100 thereto.

The acryl-based copolymer of the present invention may have a weight average molecular weight in the range of 1,000,000 g/mol to 2,000,000 g/mol, and preferably 1,500,000 g/mol to 2,000,000 g/mol. When the weight average molecular weight of the acryl-based copolymer meets the above range, a high level of durability required for a display device in which a touch panel is applied can be implemented.

The acryl-based copolymer of the present invention may have an acid value of 10 or less, preferably 5 or less, and more preferably 1 or less. The acid value refers to the number of mg of potassium hydroxide required to neutralize the free fatty acid, resin acid, etc. contained in 1 g of the acryl-based copolymer sample. When the acid value of the acryl-based copolymer is greater than 10, there may be problems in that an effect of inhibiting corrosion in a touch panel, etc. becomes insignificant, and when an alkali metal salt, etc. is added as an antistatic agent, the presence of a large number of carboxyl groups, etc. having a large interaction with an alkali metal salt may interfere with ion conduction thereby deteriorating the antistatic performance.

(2) Curing Agent

The adhesive composition according to the present invention includes a metal chelate compound and an isocyanate compound as a curing agent. The metal chelate compound and the isocyanate compound play the role of improving durability of an adhesive composition by forming a cross-linking structure by reacting with an acetoacetyl group and/or a hydroxy group in the acryl-based copolymer.

When the metal chelate compound and the isocyanate compound are used together as in the present invention, a more rapid and stronger double crosslinking structure can be obtained compared to when only one kind is used as a curing agent thereby being capable of improving the cohesive strength of an adhesive agent.

As the metal chelate compound, compounds in which a polyvalent metal (e.g., aluminum, iron, zinc, tin, titanium, antimony, magnesium, silver, zirconium, chromium, nickel, and vanadium) is coordinated around acetyl acetone, ethyl acetoacetate, for example, tris(ethyl acetoacetate)aluminum, acetoacetate aluminum diisopropylate, tris(acetylacetonate) aluminum, or a mixture thereof may be used.

The metal chelate compound may be contained in an amount of 0.01-1 parts by weight, and preferably 0.2-0.8 parts by weight, relatively to 100 parts by weight of the acryl-based copolymer. When the amount of the metal chelate compound meets the above range, there is an effect that the cohesive strength of an adhesive agent is not disrupted but maintained appropriately.

Meanwhile, as the isocyanate compound, for example, toluene diisocyanate, 2,4-tolylene diisocyanate, 2,6-tolylene diisocyanate, hydrogenated tolylene diisocyanate, isophorone diisocyanate, 1,3-xylene diisocyanate, 1,4-xylene diisocyanate, diphenylmethan-4,4-diisocyanate, 1,3-bis(isocyanatomethyl)cyclohexane, tetramethyl xylene diisocyanate, 1,5-naphthalene diisocyanate, hexamethylene diisocyanate, 2,2,4-trimethyl hexamethylene diisocyanate, 2,4,4-trimethyl hexamethylene diisocyanate, trimethylolpropane modified toluene diisocyanate, trimethylolpropane modified tolylene diisocyanate, a tolylene diisocyanate adduct of trimethylolpropane, a xylene diisocyanate adduct of trimethylolpropane, triphenylmethane triisocyanate, methylene bistriisocyanate, a polyol thereof (trimethylolpropane), a mixture thereof, etc. may be used.

The isocyanate compound may be contained in an amount of 0.01-1 parts by weight, preferably 0.01-0.8 parts by weight, and more preferably 0.1-0.5 parts by weight, relative to 100 parts by weight of the acryl-based copolymer. When the isocyanate-based curing agent is used in an amount of less than 0.01 parts by weight, it is difficult to form the cohesive strength of an adhesive agent within a desired time period, whereas when the isocyanate-based curing agent is used greater than 1 part by weight, the balance between cohesive strength and adhesive strength is disrupted thus not being able to satisfy the desired physical property.

Meanwhile, the curing agent may be contained in an amount of 0.1-2 parts by weight, and preferably 0.1-1 parts by weight, relative to 100 parts by weight of the acryl-based copolymer. When the amount of the curing agent meets the above range, the physical properties of cohesive strength and adhesive strength become excellent.

(3) Other Components

The adhesive composition of the present invention may further contain other components, such as a solvent, a silane coupling agent, an alkali metal salt, a crosslinking catalyst, a tackifier resin, an additive, etc., in addition to the above-mentioned components for the control of properties.

The adhesive composition of the present invention may further include a solvent for the control of viscosity. The solvent may include, for example, ethyl acetate, n-pentane, isopentane, neopentane, n-hexane, n-octane, n-heptane, methylethyl ketone, acetone, toluene, and a combination thereof, but the solvent is not limited thereto.

Additionally, the adhesive composition of the present invention may further include a silane coupling agent.

Such a coupling agent is used for improving the adhesion stability between an adhesive and a substrate. Examples of the coupling agent include γ-glycidoxypropyl triethoxy silane, γ-glycidoxypropyl trimethoxy silane, γ-glycidoxypropyl methyl diethoxy silane, γ-glycidoxypropyl triethoxy silane, 3-mercaptopropyl trimethoxy silane, vinyl trimethoxy silane, vinyl triethoxy silane, methacryloxypropyl trimethoxy silane, γ-methacryloxypropyl triethoxy silane, γ-aminopropyl trimethoxy silane, aminopropyl triethoxy silane, 3-isocyanate propyl triethoxy silane, γ-acetoacetylpropyl trimethoxy silane, γ-acetoacetylpropyl triethoxy silane, β-cyanoacetyl trimethoxy silane, β-cyanoacetyl triethoxy silane, and acetoxyaceto trimethoxy silane, and one or two or more kinds thereof may be mixed for use. In the present invention, a silane coupling agent having an acetoacetate group or β-cyanoacetyl may be used, but the silane-based coupling agent to be used is not limited thereto.

In the adhesive composition of the present invention, the silane-based coupling agent may be contained in an amount of 0.01-5 parts by weight, and preferably 0.01-1 parts by weight, relative to 100 parts by weight of the acryl-based copolymer. When the amount of the coupling agent is less than 0.01 parts by weight, the effect of increasing adhesion becomes insignificant, whereas when the amount of the coupling agent exceeds 5 parts by weight, the durability may be deteriorated.

Additionally, the adhesive composition of the present invention may further include an alkali metal salt to provide an antistatic performance. In particular, as the alkali metal salt, metal salts consisting of lithium, sodium, and potassium may be used, and specifically, metal salts consisting of cations consisting of $Li^+$, $Na^+$, and $K^+$, and anions consisting of $Cl^-$, $Br^-$, $I^-$, $BF_4^-$, $PF_6^-$, $SCN^-$, $ClO_4^-$, $CF_3SO_3^-$, $(CF_3SO_2)_2N^-$, and $(CF_3SO_2)_3C^-$ are appropriately used. Among them, in particular, lithium salts (e.g., LiBr, LiI, $LiBF_4$, $LiPF_6$, LiSCN, $LiClO_4$, $LiCF_3SO_3$, $Li(CF_3SO_2)_2N$, $Li(CF_3SO_2)_3C$, etc.) are desirable. The alkali metal salt may be used alone or may be used in a combination of two or more kinds.

The amount of the alkali metal salt to be mixed for use in the adhesive composition may be preferably in an amount of 0.01-5 parts by weight, and more preferably 0.05-3 parts by weight, relative to 100 parts by weight of the acryl-based copolymer. When the amount of the alkali metal salt is lower than 0.01 parts by weight, there may be a case when sufficient static property may not be obtained, whereas when the amount of the alkali metal salt is greater than 5 parts by weight, the contamination to the adherend tends to increase and is thus not desirable.

Additionally, from the aspect of controlling the adhesive property, the adhesive composition of the present invention may further include 1-100 parts by weight of a tackifier resin, relative to 100 parts by weight of the acryl-based copolymer. The types of the tackifier resin is not particularly limited, but one or a mixture of two or more kinds of resins, for example, those selected from a hydrogenated) hydrocarbon-based resin, a (hydrogenated) rosin resin, a (hydrogenated) rosin ester resin, a (hydrogenated)terpene resin, a (hydrogenated) terpene phenol resin, a polymerized rosin resin, and a polymerized rosin ester resin may be used. When the amount of the tackifier resin is less than 1 part by weight, the effect of addition may be insignificant, whereas when the tackifier resin exceeds 100 parts by weight, the effects of improving compatibility and/or cohesion may be lowered.

Additionally, the adhesive composition of the present invention may further include at least one additive selected from the group consisting of an epoxy resin, a curing agent, an ultraviolet stabilizer, an antioxidant, a coloring agent, a reinforcing agent, a filler, an antifoaming agent, a surfactant, and a plasticizer, within a range not affecting the effect of the invention.

Meanwhile, the glass transition temperature (TO of the adhesive composition of the present invention containing the above components after curing may be −30° C. or higher, and preferably from −30° C. to −20° C. When the glass transition temperature (TO of the adhesive composition after curing is lower than −30° C., durability may be reduced due to lack of elasticity.

Additionally, the adhesive composition of the present invention after curing may have a gel fraction of 90% or higher. This is because when the gel fraction after curing is lower than 90%, there may be a problem in that the heat-resistant durability cannot be met due to a lack of cohesion.

Additionally, the amount of the solid fraction in the adhesive composition may be in an amount of 10-20 wt %, and preferably 10-15 wt %, based on the total weight of the adhesive composition, and the viscosity at 23° C. may be 500-4,000 cP, and preferably 1,000-3,000 cP. When the amount of the solid fraction and the viscosity value of the adhesive composition meet the above ranges, excellent coating property can be implemented.

Polarizing Plate

Then, the polarizing plate according to the present invention will be described herein below.

The present invention also relates to a polarizing plate which includes a polarizing film; and an adhesive layer, which is formed on one surface or both surfaces of the polarizing film and includes a cured product of the adhesive composition according to the present invention described above.

The type of the polarizing film to be used in the present invention is not particularly limited, but any common type known in the art may be adopted. For example, the polarizing film may include a polarizer; and a protective film formed on one surface or both surfaces of the polarizer.

The type of the polarizer to be included in the polarizing film of the present invention is not particularly limited, and for example, any common type known in the art (e.g., a polyvinyl alcohol-based polarizer, etc.) may be adopted without limitation.

A polarizer is a functional film or sheet capable of extracting the light vibrating only one direction from incident light vibrating in various directions. Such a polarizer may be, for example, in a form in which a dichroic dye is adsorbed and oriented on a polyvinyl alcohol-based resin film. The polyvinyl alcohol-based resin film constituting a polarizer may be obtained, for example, by gelling a polyvinyl acetate-based resin. In this case, the polyvinyl acetate-based resin to be used may include vinyl acetate and copolymers of vinyl acetate and other monomers copolymerizable therewith as well as homopolymers of vinyl acetate. In the above, examples of the monomers which are copolymerizable with vinyl acetate may include unsaturated carboxylic acids, olefins, vinyl ethers, unsaturated sulfonic acids, and acrylamides having an amido group, etc., or a mixture of two or more kinds thereof, but the monomers are not limited thereto. The degree of gelation of the polyvinyl alcohol-based resin film may conventionally be about 85-100 mol %, and preferably 98 mol % or more. The polyvinyl alcohol-based resin film may be additionally modified, for example, polyvinyl formal or polyvinyl acetal modified with aldehydes may also be used. Additionally, the degree of polymerization of the polyvinyl alcohol-based resin film may conventionally be about 1,000 to 10,000, and preferably about 1,500 to 5,000.

Such a polyvinyl alcohol-based resin film as described above may be prepared and used as a disk of a polarizer. The method of forming the polyvinyl alcohol-based resin film is not particularly limited, but a common method known in the art may be used.

The thickness of the original film formed of the polyvinyl alcohol-based resin film is not particularly limited, but may be controlled, for example, in the range of 1-150 μm. The thickness of the original film may be controlled to be 10 μm or more considering the ease of stretching, etc.

The polarizer may be prepared by undergoing a process of stretching (e.g., uniaxial stretching) a polyvinyl alcohol-based resin film as described above, a process for dyeing a polyvinyl alcohol-based resin film with a dichroic dye and adsorbing the dichroic dye thereto, a process of treating a polyvinyl alcohol-based resin film to which a dichroic dye is adsorbed with a boric acid aqueous solution, a process for washing after treatment with a boric acid aqueous solution, etc. As the dichroic dye, iodine or a dichroic organic dye may be used.

The polarizing film of the present invention may further include a protective film which is formed on one surface or both surfaces of the polarizer. The type of the protective film to be included in the polarizing film of the present invention is not particularly limited, but may be formed as a multilayer film, on which the protective film consisting of a cellulose-based film (e.g., triacetyl cellulose); a polyester-based film (e.g., a polycarbonate film or a polyethylene terephthalate film); a polyethersulfone-based film; and/or a polyolefin-based film consisting of a polyethylene film, a polypropylene film, a polyolefin film with a cyclo-based or norbornene structure, or an ethylene propylene copolymer is laminated. In particular, the thickness of the protective film is not particularly limited, but it may be formed to have a common thickness.

The method of forming an adhesive layer on a polarizing film in the present invention is not particularly limited, but methods, such as a method in which an adhesive composition (coating solution) is applied to the film or element by a conventional method (e.g., a bar coater) followed by curing, a method of applying an adhesive composition to the surface of the peelable substrate, curing, and then transferring the formed adhesive layer to the surface of a polarizing film or an element, etc., may be used.

In the present invention, the process of forming an adhesive layer may be performed after sufficiently removing the bubble-inducing components (e.g., volatile components or reaction residues) in the adhesive composition (coating solution). Accordingly, the problems that the crosslinking density or the molecular weight of the adhesive is too low to lower the elastic modulus, and the bubbles existing between a glass plate and an adhesive layer at high temperature become larger to form scattering bodies therein, etc. can be prevented.

Additionally, the method of curing the adhesive composition of the present invention during the manufacture of a polarizing plate is also not particularly limited, but may be performed, for example, by maintaining the adhesive layer at an appropriate temperature so that a crosslinking reaction between the acryl-based copolymer and the curing agent contained in the composition can be induced.

Additionally, the polarizing plate of the present invention may further include at least one functional layer selected from the group consisting of a protective layer, a reflective layer, an antiglare layer, a phase difference plate, a wide viewing angle compensation film, and a brightness enhancement film.

Display Device

Then, the display device of the present invention will be described.

The display device of the present invention includes a polarizing plate according to the present invention described above.

More specifically, the display device may be a liquid crystal display device including a liquid crystal panel in which a polarizing plate according to the invention is bonded to one surface or both surfaces. In particular, the type of the liquid crystal panel is not particularly limited. In the present invention, for example, without being limited to the types thereof, all of various manual matrix methods including a twisted neumatic (TN) type, a super twisted neumatic (STN) type, a ferroelectric (F) type, a polymer dispersed LCD (PD) type, etc.; various active matrix systems including two-terminal and three-terminal types; a known liquid crystal panel including an IPS mode panel and a VA mode panel may be used. Additionally, other types of constituents to be included in the liquid crystal display device of the present invention and a manufacturing method thereof are not particularly limited, but any common constitution in the art may be adopted for use without limitation.

Additionally, the display device according to the present invention may further include a touch panel which is disposed on the polarizing plate. Since the adhesive composition of the present invention does not contain an acid component or contains in a trace amount, it has an advantage in that the electrode of the touch panel does not corrode even if the adhesive layer on a polarizing plate and the touch panel are brought into contact for a long period of time. In particular, the touch panel refers to a device that generates an electrical signal by detecting a change in capacitance caused when a conductor (e.g., human body or a stylus) touches, and various touch panels known in the art can be used without limitation.

BEST MODE FOR CARRYING OUT THE INVENTION

Hereinafter, exemplary embodiments of the present invention will be described in detail so that one of ordinary skill in the art can readily carry out the present invention. However, the present invention can be implemented in a variety of different forms and is not limited to the exemplary embodiments described herein.

Then, the present invention will be described in more detail through specific embodiments.

Preparation Example

Monomer mixtures were prepared by mixing butyl acrylate (BA), methyl methacrylate (MMA), hydroxyethyl acrylate (HEA), acetoacetyl ethyl methacrylate (AAEM), dicyclopentyl methacrylate (DCPMA), acrylic acid (AA), and phenoxy ethyl acrylate (PEA) according to the contents described in Table 1 below. A monomer mixture and 50 parts by weight of ethyl acetate (EAc) were added into a 3 L reactor, in which nitrogen gas was refluxed and which is provided with a cooling device to facilitate temperature control. Then, azo-bis (isobutyl nitrile (V-60, manufacturer: Junsei), as a polymerization initiator, was added in an amount of 0.03 parts by weight thereto while maintaining the reactor temperature at 67° C., and reacted for 8 hours to prepare acryl-based copolymers A-1 to A-7.

The weight average molecular weight (Mw) of the prepared acryl-based copolymers was measured via the method of measuring physical properties shown below and the results are shown in Table 1 below.

TABLE 1

| Category | | Preparation Examples | | | | | | |
|---|---|---|---|---|---|---|---|---|
| | | 1 | 2 | 3 | 4 | 5 | 6 | 7 |
| Acryl-based Copolymer | | A-1 | A-2 | A-3 | A-4 | A-5 | A-6 | A-7 |
| Composition (Weight Parts) | BA | 81 | 80 | 70 | 94 | 95 | 95 | 95 |
| | HEA | 5 | 5 | 5 | 1 | 5 | — | — |
| | AAEM | 5 | 5 | 5 | 5 | — | — | — |
| | MMA | 5 | 5 | 5 | — | — | — | — |
| | DCPMA | 4 | 4 | 4 | — | — | — | — |
| | AA | — | 1 | 1 | — | — | 5 | 5 |
| | PEA | — | — | 10 | — | — | — | — |
| Mw (g/mol) | | 1.65 million | 1.70 million | 1.60 million | 1.70 million | 1.80 million | 1.90 million | 200 million |

Examples and Comparative Examples

The specifications of the components used in the following Examples and Comparative Examples are as follows (A) acryl-based copolymer: the acryl-based copolymers A-1 to A-7 prepared in Preparation Examples 1 to 7 were used.

(B) Crosslinking agent:

(B-1) Metal chelate compound: the aluminium acetylacetonate of Sigma-Aldrich Co., Ltd. was used.

(B-2) Isocyanate compounds: the coronate L of Nippon Polyurethane Industry Co., Ltd. was used (B-3) Epoxy-based curing agent: the Tetrad-X of Mitsubishi Gas Chemical Company, Inc. was used.

(C) Silane coupling agent: the KBM-403 of Shin-Etsu Chemical Co., Ltd. was used.

(D) Alkali metal salt: the $Li(CF_3SO_2)_2N$ of Sigma-Aldrich Co., Ltd. was used.

The components (A) to (C) were added to ethyl acetate of 40 parts by weight, according to the contents described in Table 2 below, mixed, and stirred to prepare adhesive compositions. The contents described in Table 2 below are expressed as parts by weight relative to 100 parts by weight of the acryl-based copolymer.

The glass transition temperatures of the adhesive compositions of Examples and Comparative Examples prepared as described above were measured according to the method for measuring the physical properties shown below.

Additionally, adhesive sheets or polarizing plates were prepared using the adhesive compositions of Examples and Comparative Examples prepared as described above, and the creep, adhesive strength at room temperature, adhesive strength after curing, long-term durability, gel fraction, corrosiveness, and level of light leakage were measured according to the method for measuring the physical properties shown below. The measurement results are described in Table 2 below.

Measurement Methods of Physical Properties (1) Weight Average Molecular Weight (g/Mol):

The weight average molecular weight of the acryl-based copolymers prepared in Preparation Examples was measured under the following conditions using GPC and the measurement results were converted using the standard polystyrene of Agilent system.

<Measurement Conditions>

Measuring instrument: Agilent GPC (Agilent 1200 series, USA)

Column: two PL Mixed B are connected

Column temperature: 40° C.

Eluent: tetrohydrofuran

Concentration: about 1 mg/mL (100 μL injection)

(2) Glass Transition Temperature (° C.):

Each of the adhesive compositions prepared in Examples and Comparative Examples was applied to a release film, and dried at 85° C. for 3 minutes to form an adhesive layer. The release film on which the adhesive layer was applied was placed under the constant temperature and humidity conditions (23° C., 50% R.H.) for 6 days. Then, a sample was collected from the adhesive layer, the glass transition temperature of each cured adhesive composition was measured using a differential scanning calorimeter (DSC). Specifically, about 3-8 mg of each adhesive layer was collected as a sample, and the collected sample was sealed in a pan, and endothermic and calorific values were measured while heating at an increasing rate of 10° C./min within a range of −50° C. to 150° C., and the glass transition temperature was measured through the same.

(3) Creep (μm)

Specimens were prepared by cutting each of the polarizing plates prepared in Examples and Comparative Examples to a size of 10 mm (width)×10 mm (length). Then, each release PET film attached to an adhesive layer was peeled off, and a specimen for measurement was prepared by attaching the polarizing plate to alkali-free glass according to JIS Z 0237 using a 2 kg roller. The specimen for measurement was stored under the constant temperature and humidity conditions (23° C., 50% R.H.) for 1 day and 6 days, respectively, and the creep of each specimen was measured using a texture analyzer (TA, Stable Micro Systems Ltd., UK). Specifically, the creep was measured as the distance (unit: μm) pushed by a polarizing plate from the glass substrate when the polarizing plate of the specimen to be measured was pulled for 1,000 seconds at a load of 1,000 g.

(4) Adhesive Strength at Room Temperature (Gf/25 mm)

Each of the polarizing plates prepared in Examples and Comparative Examples was stored under the constant temperature and humidity conditions (23° C., 50% R.H.) for 3 days and 6 days, respectively, and cut to a size of 25 mm (width)×100 mm (length) to prepare a specimen. Then, each release PET film attached to an adhesive layer was peeled off, and a specimen for measurement was prepared by attaching the polarizing plate to alkali-free glass according to JIS Z 0237 using a 2 kg roller.

The specimen for measurement was stored under the constant temperature and humidity conditions (23° C., 50% R.H.) for 4 hours. The polarizing plate was pulled under the conditions (peeling speed: 300 mm/min, peeling angel: 180°) using a texture analyzer (TA, Stable Micro Systems Ltd., UK), and the force required for the complete separation of the polarizing plate from the glass substrate was measured and thereby the adhesive strength at room temperature (unit: gf/25 mm) was measured.

(5) Adhesive Strength after Curing (Gf/25 mm)

Each of the adhesive compositions prepared in Examples and Comparative Examples was laminated to a corona-treated PET (thickness: 100 μm) to prepare an adhesive film, and the adhesive film was stored for 6 days. Then, the adhesive film was cut to a size of 25 mm (width)×100 mm (length) to prepare a specimen. Then, each release PET film attached to an adhesive layer was peeled off, and a specimen for measurement was prepared by attaching the adhesive film to alkali-free glass according to JIS Z 0237 using a 2 kg roller. Then, each specimen to be measured was placed at 110° C. for 24 hours and 250 hours, respectively. The adhesive film was pulled under the conditions (peeling speed: 300 mm/min, peeling angel: 180°) using a texture analyzer (TA, Stable Micro Systems Ltd., UK), and the force required for the complete separation of the adhesive film from the glass substrate was measured and thereby the adhesive strength at room temperature (unit: gf/25 mm) was measured.

(6) Evaluation of Durability

Each of the polarizing plates prepared in Examples and Comparative Examples was attached to an alkali-free glass substrate to prepare a specimen to be measured.

Each of the prepared specimens to be measured was placed at 80° C. and 110° C., respectively, for 500 hours, and evaluated by visual observation of the occurrence of bubbles or peeling.

<Evaluation Standards>

OK: No bubbles and peeling observed

NG: Bubbles and/or peeling observed.

(7) Gel Fraction (Unit: %)

Each of the adhesive compositions prepared in Examples and Comparative Examples was applied to a release film, and dried at 85° C. for 3 minutes to form an adhesive layer. The release film on which the adhesive layer was applied was placed under the constant temperature and humidity conditions (23° C., 50% R.H.) for 6 days. Then, the adhesive layer was peeled off from the release film to collect a sample and the weight ($W_0$) of the sample was measured. Then, ethyl acetate was added to the collected adhesive layer sample and dissolved for 72 hours. Then, the resultant was separated by filtration using a stainless steel wire mesh (W$_3$ (g), 200 mesh), dried at 150° C. for 30 minutes, and the total weight of the residue (W$_2$ (g)) was measured. The value obtained by subtracting the weight of the stainless steel wire mesh (W$_3$) from the total weight (W$_2$) was set as W$_1$, and W$_0$ and W$_1$ were substituted into the following equation (1) to obtain a gel fraction.

$$\text{gel fraction (\%)} = (W_1/W_0) \times 100 \quad \text{Equation (1):}$$

(8) Corrosiveness

Each of the adhesive compositions prepared in Examples and Comparative Examples was applied to a release film, and dried at 85° C. for 3 minutes to form an adhesive layer. Then, the adhesive layer was laminated onto an ITO film, and the resistance of the film (A$_0$) was measured using a linear resistance measuring device (Wolfgang Metriso 2000).

Then, the ITO film was allowed to stand for 10 days under the high temperature and humidity conditions (60° C., 90%) for 10 days, and the resistance of the film (A$_1$) was measured using a linear resistance measuring device (Wolfgang Metriso 2000). The measured resistance value was substituted into Equation (2) below to measure the rate of change in resistance, and the corrosiveness was determined according to the following conditions for evaluation. It may be determined that as the resistance value increases, the corrosion has occurred.

$$\text{Rate of change in resistance (\%)} = (A_1 - A_0/A_0) \times 100 \quad \text{Equation (2):}$$

In Equation (2), A$_0$ represents a resistance value of a film before the film was subjected to the high temperature and humidity conditions, and A$_1$ represents a resistance value of a film which was measured after storing the specimen under the 60° C., 90% RH conditions for 10 days.

<Evaluation Standards>

OK: the value of rate of change in resistance is less than 30%.

NG: the value of rate of change in resistance is higher than 30%.

(9) Evaluation of Light Leakage

Two polarizing plates (160 mm×90 mm) prepared in Examples and Comparative Examples were attached on both sides of an alkali-free glass substrate so that the optical axis of the polarizing plates could be crossed 90 degrees to prepare specimens to be measured. Then, the specimens to be measured were placed at 95° C. for 250 hours, taken out at room temperature and placed on a backlight, and the uniformity of light transmission was evaluated by visual observation in a dark room. The evaluation criteria are as follows.

⊚: Non-uniformity of light transmittance is not visually confirmed.

○: Non-uniformity of light transmittance is slightly confirmed.

X: Non-uniformity of light transmittance is confirmed to a large extent.

TABLE 2

| Category | | Examples | | | Comparative Examples | | | | | | |
|---|---|---|---|---|---|---|---|---|---|---|---|
| | | 1 | 2 | 3 | 1 | 2 | 3 | 4 | 5 | 6 | 7 |
| (A) Acryl- based Copolymer (WeightParts) | A-1 | 100 | | | | | | | 100 | 100 | |
| | A-2 | | 100 | | | | | | | | |
| | A-3 | | | 100 | | | | | | | |
| | A-4 | | | | 100 | | | | | | |
| | A-5 | | | | | 100 | | | | | 100 |
| | A-6 | | | | | | 100 | | | | |
| | A-7 | | | | | | | 100 | | | |
| (B) Curing Agent (WeightParts) | B-1 | 0.5 | 0.5 | 0.5 | 0.3 | 1 | 1 | 1 | 1 | | 0.3 |
| | B-2 | 0.3 | 0.3 | 0.3 | 0.5 | | | 0.5 | | 1 | 0.5 |
| | B-3 | | | | | | | 0.1 | 0.1 | | |
| (C) Silane Coupling Agent (Weight Parts) | | 0.2 | 0.2 | 0.2 | 0.2 | 0.2 | 0.2 | 0.2 | 0.2 | 0.2 | 0.2 |
| (D) Alkali Metal Salt (Weight Parts) | | 1.5 | 1.5 | 1.5 | 1.5 | 1.5 | 1.5 | 1.5 | 1.5 | 1.5 | 1.5 |
| Glass Transition Temperature (T$_g$) | | −25 | −23 | −20 | −45 | −43 | −36 | −32 | −40 | −37 | −45 |
| Creep | After 1 Day | 135 | 122 | 122 | 704 | 546 | 250 | 153 | 170 | 200 | 880 |
| | After 6 Days | 115 | 110 | 112 | 323 | 211 | 190 | 110 | 160 | 137 | 301 |
| Adhesive Strength at Room Temperature | After 3 Days | 337 | 975 | 364 | 270 | 514 | 904 | 552 | 345 | 346 | 828 |
| | After 6 Days | 257 | 750 | 231 | 213 | 400 | 723 | 432 | 204 | 319 | 570 |
| Adhesive Strength after Curing | 24 Hours | 3,054 | 3,292 | 3,024 | 2,820 | 2,520 | 3,567 | 4,829 | 2,350 | 3,154 | 2,150 |
| | 250 Hours | 2,697 | 2,895 | 2,794 | 2,391 | 2,286 | 2,406 | 4,820 | 2,020 | 2,714 | 1,770 |
| Durability | 80° C. | OK | OK | OK | OK | NG | OK | OK | OK | NG | NG |
| | 110° C. | OK | OK | OK | NG | NG | NG | OK | NG | NG | NG |

TABLE 2-continued

| | Category | Examples | | | Comparative Examples | | | | | | |
|---|---|---|---|---|---|---|---|---|---|---|---|
| | | 1 | 2 | 3 | 1 | 2 | 3 | 4 | 5 | 6 | 7 |
| Gel Fraction | After 6 Days | 91 | 92 | 91 | 90 | 78 | 83 | 90 | 75 | 91 | 70 |
| Corrosiveness | | OK | OK | OK | OK | OK | NG | NG | OK | OK | OK |
| Light Leakage | | ○ | ○ | ◎ | X | X | ○ | ○ | X | X | X |

As shown in Table 2 above, it was confirmed that the adhesive compositions according to Examples 1 to 3 of the present invention had high gel fraction values, good creep, adhesive strength at room temperature, and adhesive strength after curing, and excellent durability at high temperature (110° C.). Additionally, the adhesive compositions according to Examples 1 to 3 of the present invention showed excellent characteristics with regard to corrosiveness and light leakage. In contrast, the adhesive composition of Comparative Example 1, in which the acryl-based copolymer prepared without using a (meth)acrylate monomer having an alicyclic group was used, showed decreases in the characteristics with regard to the high temperature (110° C.) durability and light leakage; and the adhesive compositions of Comparative Examples 2 and 7, in which the acrylic copolymers prepared without using a (meth)acrylate monomer having an alicyclic group and a monomer having an acetoacetyl group were used, showed decreases in the characteristics with regard to the gel fraction, high temperature durability, and light leakage.

Meanwhile, the adhesive composition of Comparative Examples 3 and 4, in which the acrylic copolymers prepared using acrylic acid were used, showed an occurrence of corrosion, whereas the adhesive composition of Comparative Examples 5 and 6, in which the acrylic copolymers prepared using only one curing agent were used, showed decreases in the characteristics with regard to the high temperature (110° C.) durability and light leakage.

The invention claimed is:

1. An acryl-based adhesive composition comprising:
    an acryl-based copolymer which is formed by polymerization of a monomer mixture including:
    a (meth)acryl-based monomer comprising an acetoacetyl group, selected from the group consisting of acetoacetyl ethyl methacrylate and acetoacetyl ethyl acrylate;
    a (meth)acryl-based monomer comprising a hydroxy group;
    a (meth)acrylate monomer comprising an alicyclic group; and
    an alkyl (meth) acrylate-based monomer comprising a mixture of an alkyl acrylate and an alkyl methacrylate;
    a silane-based coupling agent; and
    a curing agent comprising a metal chelate compound and an isocyanate compound,
    wherein the acryl-based polymer has a weight average molecular weight of 1,500,000 g/mol to 2,000,000 g/mol,
    wherein the acryl-based adhesive composition has a glass transition temperature of −30° C. or greater after curing,
    wherein the metal chelate compound and the isocyanate compound are each contained in an amount of 0.01 to 1 part by weight, relative to 100 parts by weight of the acryl-based copolymer,
    wherein the silane-based coupling agent is contained in an amount of 0.01 to 1 part by weight, relative to 100 parts by weight of the acryl-based copolymer,
    wherein the monomer mixture comprises, relative to 100 parts by weight of the monomer mixture,
    1-40 parts by weight of the (meth)acryl-based monomer comprising an acetoacetyl group;
    1-10 parts by weight of the (meth)acryl-based monomer comprising a hydroxy group;
    1-10 parts by weight of the (meth) acrylate monomer comprising an alicyclic group; and
    40-97 parts by weight of the alkyl (meth) acrylate-based monomer, with a mixing ratio between the alkyl acrylate and the alkyl methacrylate of 20:1 to 5:1.

2. The acryl-based adhesive composition of claim 1, wherein the monomer mixture further comprises an (meth) acrylate-based monomer comprising an aromatic group.

3. The acryl-based adhesive composition of claim 2, wherein the monomer mixture comprises, relative to 100 parts by weight of the monomer mixture,
    1-40 parts by weight of the (meth)acryl-based monomer comprising an acetoacetyl group;
    1-10 parts by weight of the (meth)acryl-based monomer comprising a hydroxy group;
    1-10 parts by weight of the (meth) acrylate monomer comprising an alicyclic group;
    1-20 parts by weight of the (meth) acrylate-based monomer comprising an aromatic group; and
    40-96 parts by weight of the alkyl (meth) acrylate-based monomer.

4. The acryl-based adhesive composition of claim 1, wherein the monomer mixture further comprises a monomer including a carboxy group.

5. The acryl-based adhesive composition of claim 4, wherein the monomer comprising a carboxy group is comprised in an amount of 3 parts by weight or less relative to 100 parts by weight of the monomer mixture.

6. The acryl-based adhesive composition of claim 1, wherein the acryl-based copolymer has polymerization conversion of 70% to 90%.

7. The acryl-based adhesive composition of claim 1, wherein the curing agent is comprised in an amount of 0.1-2 parts by weight relative to 100 parts by weight of the acryl-based copolymer.

8. The acryl-based adhesive composition of claim 1, further comprising an alkali metal salt.

9. The acryl-based adhesive composition of claim 1, further comprising a lithium salt in an amount of 0.01-5 parts by weight relative to 100 parts by weight of the acryl-based copolymer,
    wherein the acryl-based copolymer has an acid value of 10 or less; and
    the curing agent is comprised in an amount of 0.1-2 parts by weight relative to 100 parts by weight of the acryl-based copolymer.

10. The acryl-based adhesive composition of claim 1, wherein the acryl-based adhesive composition has a gel fraction of 90% or higher after curing.

11. A polarizing plate comprising:
   a polarizing film; and
   an adhesive layer, which is formed on one surface or both surfaces of the polarizing film and comprises a cured product of the acryl-based adhesive composition according to claim 1.

12. A display device comprising the polarizing plate of claim 11, and a liquid crystal panel, wherein the polarizing plate is bonded to at least one surface of the liquid crystal panel.

13. The display device of claim 12, further comprising a touch panel disposed on the polarizing plate.

\* \* \* \* \*